United States Patent [19]

Guritz et al.

[11] 4,244,484

[45] Jan. 13, 1981

[54] SERVICE FITTING ASSEMBLY

[76] Inventors: Kenneth E. Guritz, 570 Emerald Harbor Dr., Longboat Key, Fla. 33548; Michael L. Guritz, 6904 Manatee Ave. West, Bradenton, Fla. 33508

[21] Appl. No.: 79,958

[22] Filed: Sep. 28, 1979

[51] Int. Cl.³ .............................................. H02G 3/08
[52] U.S. Cl. .................................... 220/3.7; 220/3.4; 174/48; 52/221
[58] Field of Search .......................... 220/3.4, 3.7, 3.8; 174/48, 49, 51, 53, 57; 52/221, 99

[56] References Cited

U.S. PATENT DOCUMENTS

| 3,844,440 | 10/1974 | Hadfield | 220/3.7 |
| 3,912,106 | 10/1975 | Traupe | 220/3.7 X |
| 3,973,366 | 8/1976 | Balane et al. | 220/3.4 X |

Primary Examiner—George T. Hall

Attorney, Agent, or Firm—Arthur W. Fisher, III

[57] ABSTRACT

A service fitting assembly of the type attachable to a floor outlet box and accompanying under-floor race way assembly housing electrical power and telephone service cables wherein the cables protrude out of the service fitting assembly into the service area from the under-floor race way assembly. The service fitting assembly includes a base element movable on the interior of a supporting mounting ring for selectively positioning in an outwardly and upwardly extending relation to the mounting ring and the floor surface on which it is mounted. The subject structure allows for liquid cleaning of the floor area without the penetration of water or liquid into the interior of the service fitting assembly. A seal means is provided to exclude such liquid or water leakage into the interior of the service fitting assembly thereby preventing exposure of such liquid to the service cables mounted therein and extending therefrom.

10 Claims, 5 Drawing Figures

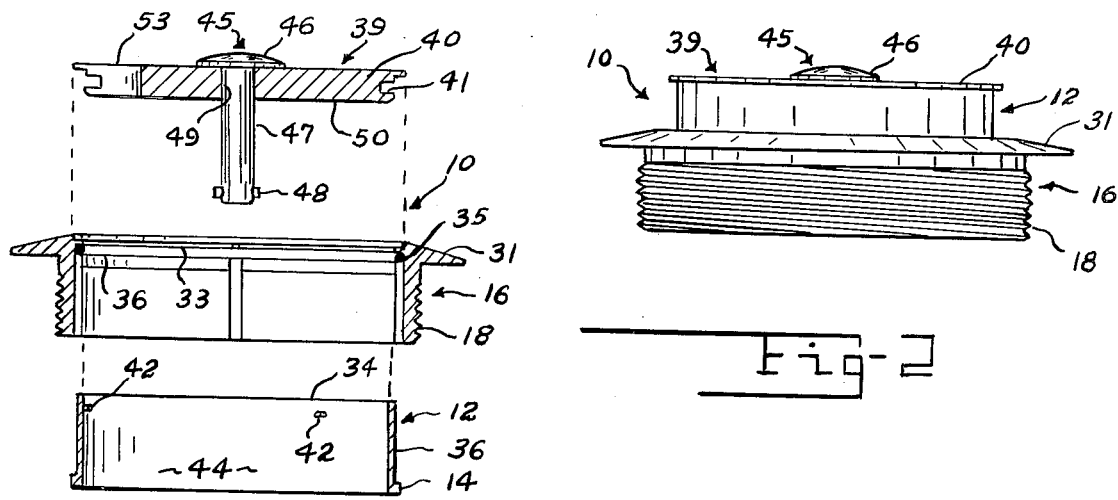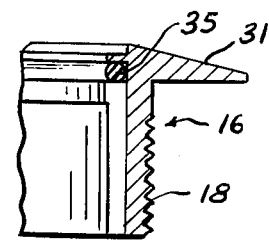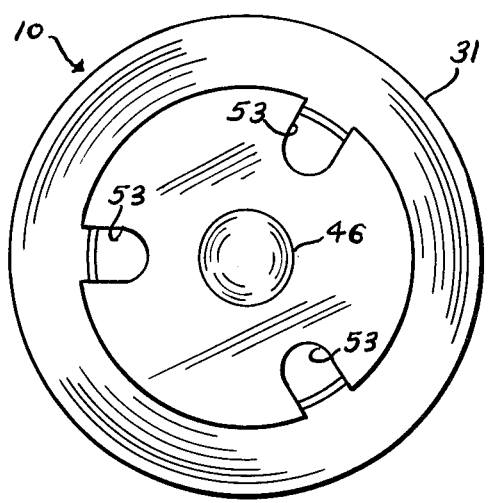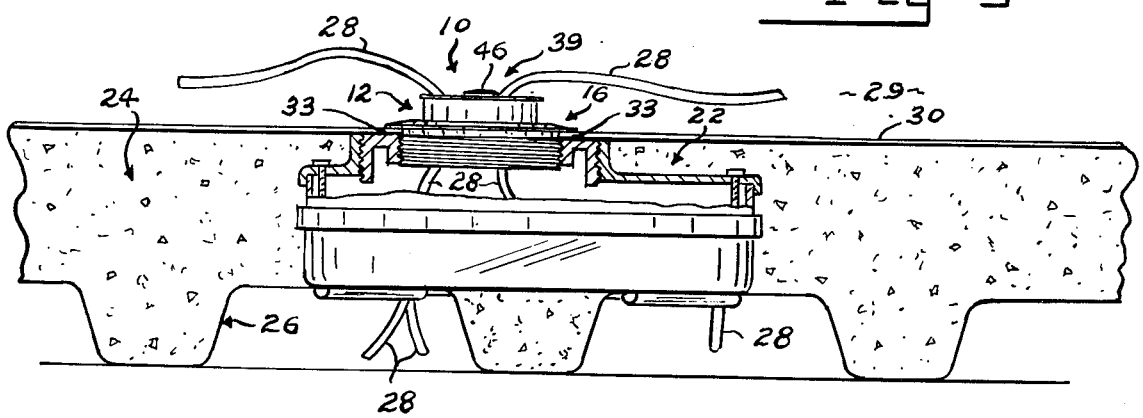

SERVICE FITTING ASSEMBLY

BACKGROUND OF THE INVENTION

1. Field of the Invention

This invention relates to a floor fitting designed to be positionable in substantially flush relation to the floor surface and specifically structured to allow exiting therefrom of both telephone and electrical power service cables which are normally housed in electrical housing conduit or race way structure permanently secured within a poured concrete floor in which the race way structure is embedded.

2. Description of the Prior Art

In the construction of large multilevel buildings as well as other smaller multilevel or floor structures, the use of steel or metallic decking on which concrete is poured has come into wide acceptance and use. In such construction service cables including electrical power and telephone cables are housed within such decking or special electrical housing conduits such as feeder and distribution race way structures. This distribution assembly embedded in the concrete floor is used to place the required service cables over a floor area in order to provide adequate telephone and electrical power service outlet over the desired floor area. Electrical terminal or junction outlet boxes are interconnected to the electrical housing or race way structures to allow access to and exiting from the service cables at a given spaced apart points along the formed concrete floor area. These outlet boxes are specifically structured to protrude upwardly from the race way structures and each further includes service fitting assemblies which are interconnected to the outlet boxes and are disposed for substantially flush or upwardly extending positioning to the used or usable exterior surface of the floor.

In the designing and structuring of such service fittings many factors have to be taken into consideration. First such service fitting should be efficiently functional to allow access to the service cables or alternately protusion of the surface cables through the fitting assembly to the abovefloor service area where the service cables are utilized.

In addition such service fitting assemblies should be esthetically pleasing since they are frequently exposed openly on the occupied floor surface.

However, when considering the utilization of prior art or known fitting assemblies, certain problems exist in their everyday use. Such problems include the strict regulations or code requirements that such fitting assemblies must meet. Included in these regulations is the requirement that no liquid leakage or seepage be allowed into the interior of the fitting assemblies so as to prevent exposure of the service cables therein to any type of water. Accordingly, when cleaning the occupied floor areas each of the fitting assemblies must be sealed or otherwise closed off to prevent leakage of the cleaning or washing solution, water, into the interior of such fitting assemblies. This is especially true when the occupied or exposed floor surface is made of tile and is washable by liquid solutions. In such cases the cleaning crew or some responsible person must specifically seal or close off each of the service fittings to prevent such leakage when utilizing numerous designs presently available. This is an extremely burdensome task due to the extremely large number of such service fittings or assemblies. Commonly such service fittings are located in spaced apart relation to one another at a distance of approximately every five feet. Accordingly, it is readily seen that there are literally hundreds of such service fittings on each floor of a multifloor building structure.

In order to facilitate such cleaning services there is an obvious need in the building industry for a service fitting which is capable of preventing leakage during the cleaning operation with a minimal amount of manipulation or handling to accomplish such sealing.

Existing codes governing the structural design of such fittings allows for an upward projection or "head" of one quarter inch or greater above the surface being cleaned. When such fittings extend above the floor surface being cleaned to such an extent it is presumed that leakage is prevented from tile or like floor surfaces being cleaned.

Therefore, the structural design of any such desired and/or preferred service fittings to be such as to readily accomplish the upward or outward projection of a portion of the service fitting with a minimal amount of manual manipulation thereby taking a minimal amount of time in adjustably positioning portions of such service fittings to allow easy and fast cleaning of the floor surface being cleaned.

SUMMARY OF THE INVENTION

This invention relates to a service fitting assembly of the type designed to be interconnected to an outlet or junction terminal box which in turn is attached to race way structure or service cable housings embedded in concrete floors. Such type of construction is commonly known in the building industry. The service fitting assembly of the present invention comprises a base element movably secured on the interior of a mounting means. The mounting means comprises a mounting ring having a threaded surface along a portion of the exterior surface thereof for interconnection to an outlet box. The base element itself is in the form of a hollow ring and is disposed in co-axial relation to the hollow mounting ring which comprises the mounting means. The base element is telescopically movable on the interior of the mounting ring and is positionable to extend outwardly therefrom, upwardly above the surface of the mounting ring and above the surface of the floor on which the service fitting is mounted.

A sealing means is provided, preferably in the form of an o-ring or like sealing element which has an annular configuration and which is mounted on substantially the interior surface of the mounting ring. The disposition of the sealing o-ring is such as to slidably engage the exterior surface of the base element. Accordingly the junction between the supporting mounting ring and the base element is "liquid proof" due to the existence of the sealing ring contiguous to this line of junction. Liquid, is thereby prevented from entering into the interior of the service fitting assembly. Exposure of the service cables within the service fitting assembly to the liquid is thereby prevented. This liquid sealing relation is between the exterior surface of the base element and the mounting ring is maintained irrespective of the position of the base element relative to the mounting ring.

Further structural features of the present invention comprise a covering means connected to the base element. Access means defined by the upper or free end of the base element along its preferal edge allows access of the service cables from the interior of the service fitting. The covering means, generally in the form of a plug element is attached to this access means which in turn defines an aperture. At least one and preferably a plurality of openings is formed in the plug element to allow exiting of one or more of the service cables through the aperture as the service cables protrude through the entire service fitting assembly.

A pull means in the form of a handle or pull element is secured to the plug element and is allowed to extend outwardly therefrom. External force exerted in an upward or vertical manner in turn places force on the plug element. Due to the interconnection of the plug element and the base means, the base means thereby has the external pull force exerted thereon causing its outward movement relative to the mounting ring. This outward movement eventually results in the outwardly extending positioning of the base element and the positioning of the plug element with its integrally formed openings, from which the service cables protrude in a position above the floor surface being cleaned. The distance of upward projection is at least greater than one-quarter of an inch so as to perform with common electrical code and regulations. The existence of the sealing means at the junction between the exterior surface of the base element and the mounting ring prevents leakage of the cleaning liquid into the interior of the service fitting assembly. Accordingly, the service cables are prevented from direct exposure or contact with the liquid used in the cleaning solution during the cleaning of the floor surface.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing in which:

FIG. 1 is an exploded view in partial section showing the structural features of the service fitting assembly as the present invention.

FIG. 2 is an assembled view of the service fitting assembly basically as shown in FIG. 1.

FIG. 3 is a top view of the embodiments of FIGS. 1 and 2.

FIG. 4 is a side view with the fitting assembly of the present invention in assembled relation within a concrete floor and associated decking representing conventional installation facilities at the service fitting assembly of the present invention will be used.

FIG. 5 is a detailed view in partial cutaway and section of interior portions of the base of the subject service fitting.

Similar reference characters refer to similar parts throughout the several views of the drawings.

DETAILED DESCRIPTION OF THE PREFERRED EMBODIMENT

With reference to FIGS. 1 through 4 the fitting assembly of the present invention is generally represented as 10 and includes a base means 12 having a substantially hollow and annular configuration with an outwardly projecting stoppering 14 integrally attached thereto and disposed to extend outwardly from the exterior surface of the remainder of the base means 12. As best shown in FIG. 1 the base means or element 12 is designed to fit on the interior of a mounting means generally indicated as 16 in the form of a mounting ring. The mounting ring comprises an exterior surface having a threaded portion integrally formed at least along a portion of its length as shown at 18. The threaded portion 18 is specifically dimensioned and configured to fit within a receptacle and correspondingly threaded portion 20 which itself forms part of the junction box or terminal box generally indicated as 22. The terminal box and receptacle portion 22 and 20 respectively do not per se form any part of the present invention but are shown in FIG. 4 as being representative of typical similarly structured terminal or junction boxes well recognized in the industry. In conventional fashion the terminal or junction box 22 is designed to be imbedded within a poured concrete floor generally indicated as 24 which also includes steel decking or the like 26 which serves as race way to house cable which may be in the form of telephone or electric power service cable 28.

Referring again to FIG. 1 it is important to note that both the base element or means 12 and the mounting ring 16 are hollow and substantially annularly configured and further mounted in aligned relation to one another so that the service cables 28 may pass from the race way or terminal box 26 and/or 22 therethrough into the interior or hollow portion of the mounting ring 16 and the base element 12 so as to be allowed to exit into the service area above the exposed floor surface 30 wherein the cables are utilized.

Further structural features of the mounting means 16 includes an outwardly extending and integrally formed flange means 31 having a substantially annular configuration and being specifically conformed to overlap adjacent portions of the flooring surface as at 33 (FIG. 4). This allows a flush or substantially flush interengagement between the service fitting assembly 10 and the floor surface itself 30.

As clearly represented in FIG. 1 the base element 12 is disposed on the interior of the mounting ring 16 in movable telescopic relation on the interior thereof. This movable mounting allows the upwardly and outwardly extension of the base element 12 as shown in both FIGS. 2 and 4. Accordingly the axis means defined by the upper peripheral edge 34 of the service fitting 10 is disposed in raised above relation to the usable floor surface 30 a predetermined distance, at least one-fourth (1/4) of an inch, above such surface 30.

Other structural features disclose a sealing means 35 which may be generally in the form of an O-ring and disposed in engagement with the interior surface as at 36 of the mounting ring 18 and in sealing engagement with the exterior surface 37 of the base element. Interengagement with the stop ring or element 14 with an area adjacent or contiguous to the O-ring 35 causes a stop in the upward movement of the base ring 36 and yet maintains a liquid tight or sealing junction or inter engagement between the mounting element 16 and the base element 12. This sealing engagement prevents leakage of liquid, water or any washing solution into the interior of the service fitting assembly and thereby prevents exposure to any service cables 28 with any type of liquid.

Other structural features of the present invention comprise a closure means generally indicated as 39 in the form of a closure element disposed in covering or enclosing relation to the access means 34 associated with the base element 12. This closure means 39 essentially comprises a disc element dimensioned and configured to cover the access aperture 34 wherein in such element is indicated as 40. An annular groove 41 is formed in the disc or cover element 40 and is disposed to engage the outwardly extending fingers 42 extending outwardly from the interior surface 44 of the base element 12. These fingers, when disposed in the actual groove 41 prevents removal of the base element 40 therefrom. Further a pull means generally indicated as 45 comprises an outwardly projecting knob element 46 attached to an elongated pull rod 47 which has stop element 48 attached to the opposite surface thereof as indicated in FIG. 1. The rod 47 is movable relative to the disc element 40 by means of being slidingly mounted within an aperture 49 in the disc element 40. Upward motion of the pull rod 40 causes engagement of the stop element 48 with the under surface 50 of the disc element 40. Continued upward or pulling force on the knob 46 causes an upward or pulling action on the disc element 39. This in turn is transferred to the fingers 42 which causes the entire upward movement of the base element 36 relative to the interior of the mounting ring 16. Accordingly the base element may easily be positioned in its upwardly or outwardly extending relation as shown in FIGS. 2 and 4. Accordingly, the floor surface 30 may be easily washed or cleaned with any type of liquid solution without fear of water being passed into the interior of either the mounting ring 16 or the base element 12.

With regard to FIG. 3 access apertures 53 are provided at various points in the closure element or disc 40 so as to provide space for the service cables 28 to exit from the interior of the junction or terminal box 22 and the interior of the service fitting assembly 10.

Also it should be noted that the projecting fingers 42 that are normally disposed on the interior of groove 41 of the closure element 40 may be aligned with the apertures 53. When so aligned the entire closure element 40 may be removed from the base element 12 to provide clear access to the interior of the service fitting assembly and the junction or terminal box 22.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A service fitting assembly of the type designed to provide access for service cable from under-floor race way assembly to and above-floor service area: said service fitting comprising a base element, mounting means movably attached to said base element in substantially supporting relation thereto, said supporting means structured and disposed for interconnection to the under-floor race way to which said service fitting may be attached, access means comprising an aperture disposed in interconnecting relation between the above-floor surface and the under-floor race way assembly housing the service cable, said aperture defined at least partially by the free end peripheral edge of said base element; seal means disposed in liquid sealing engagement between said mounting means and said base element, whereby liquid is prevented from entering said service fitting assembly at the junction of said base element and mounting means contiguous said sealing means.

2. A service fitting assembly as in claim 1 wherein said mounting means comprises an open interior mounting ring disposed in aligned, co-axial relation with said base element and said aperture, whereby said service fitting defines a passage for communication of the service cable from the underfloor race way to the above-floor service area.

3. A service fitting assembly as in claim 2 wherein said mounting ring comprises an exterior threaded surface portion extending along at least a portion of the length of said mounting ring, whereby said mounting ring is attachable to a floor outlet box of the under-floor race way assembly.

4. A service fitting assembly as in claim 2 wherein said mounting ring further comprises flange means integrally attached thereto and having an angular configuration and disposed to extend outwardly in a radial direction from an exterior surface portion of said mounting ring.

5. A service fitting assembly as in claim 2 wherein said base element comprises a base ring slidably movable in telescoping relation on the interior of said mounting ring, said seal means disposed in sliding and liquid sealing engagement with at least a portion of the exterior surface of said base element, said base ring selectively positionable in an outwardly extending position from the interior of said mounting ring and along a direction colinear to the common axis of said base ring and said mounting ring, whereby liquid is prevented from entering said service fitting assembly at the junction of said mounting ring and said base ring contiguous said seal means.

6. A service fitting assembly as in claim 2 wherein said seal means comprises an o-ring means secured to said mounting ring and disposed for sliding and sealing engagement with an exterior surface portion of said base means.

7. A service fitting assembly as in claim 1 further comprising closure means removably mounted on said base element in substantially covering relation to said aperture.

8. A service fitting assembly as in claim 7 wherein said closure means comprises a plug element, removably secured to said base means in at least partially covering relation to said aperture, said plug element including at least one opening formed therein, whereby the service cable may protrude through said plug element from the under-floor race way assembly to above-floor service area.

9. A service fitting assembly as in claim 8 further comprising cover mounting means disposed in interconnecting relation between said plug element and said base element, said cover mounting means comprising a plurality of fingers extending outwardly from an interior surface of said base element, groove means including annular configuration formed in an exterior surface of said plug element and open outwardly thereof, said groove means dimensioned and disposed for slidable engagement with said plurality of fingers.

10. A service fitting assembly as in claim 7 further comprising pull means secured to said cover means and mounted to extend outwardly therefrom and provide exterior pull force to said cover means and said attached base means, whereby said base means may be disposed in outwardly extending relation to said mounting means.

* * * * *